United States Patent Office 2,892,284
Patented June 30, 1959

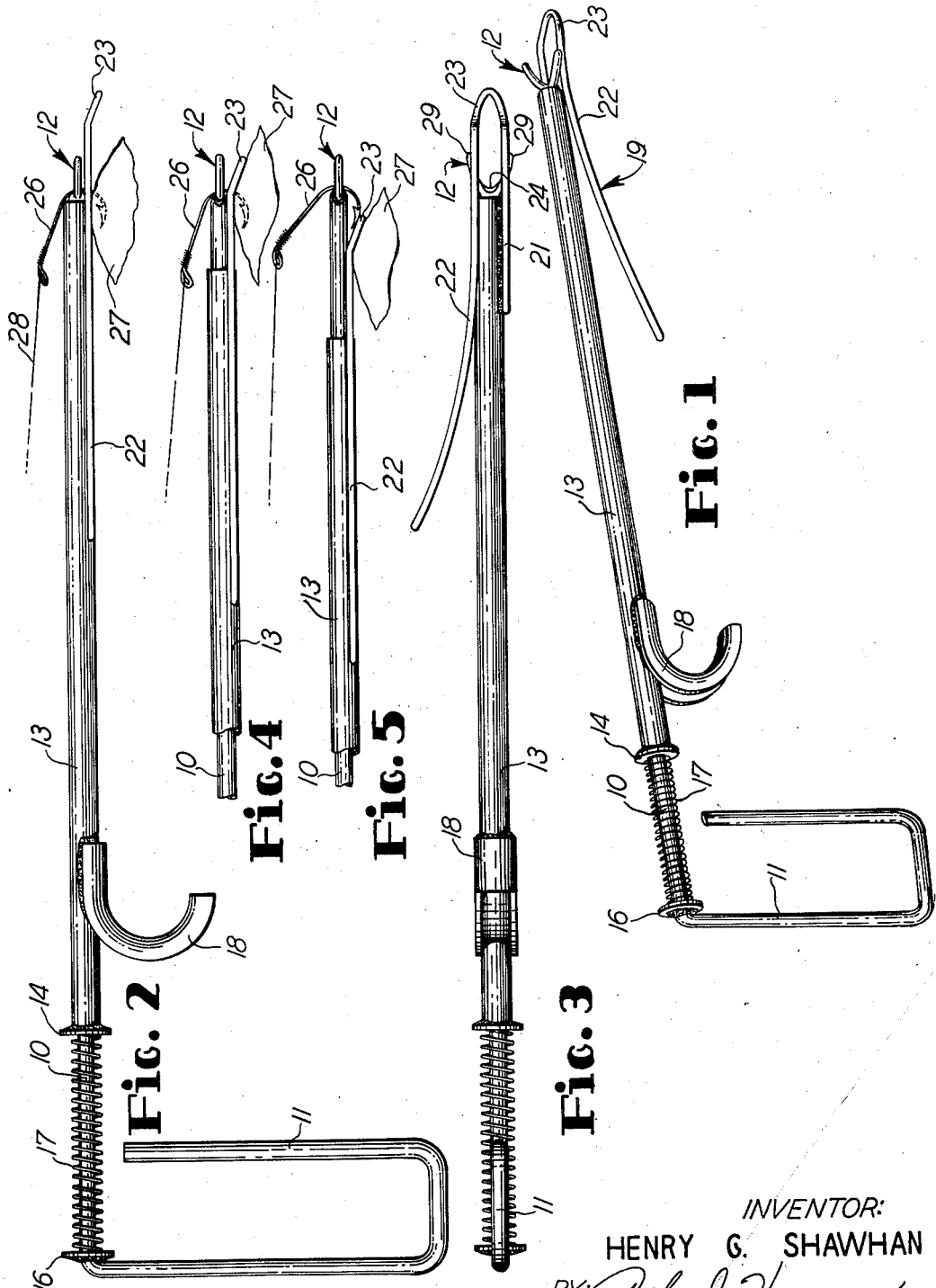

2,892,284
FISH HOOK EXTRACTOR
Henry G. Shawhan, Franksville, Wis.

Application June 17, 1957, Serial No. 665,972

5 Claims. (Cl. 43—53.5)

This invention relates to a fish hook extractor of the type employed for removing a fish hook from a fish's mouth.

It is a general object of this invention to provide an improved fish hook extractor, and it is a specific object of this invention to provide a fish hook extractor which is reliable in operation but yet inexpensive and simple in construction.

Fish hook extractors are known, and they generally consist of a handle and a trigger with a spring means for urging the handle and the trigger away from each other, and with means on the end of the extractor for engaging the fish hook and removing it from the fish's mouth. However, this heretofore known type of extractor has not been found to be reliable in its intended function of removing a hook from a fish's mouth in that often the hook is jammed in the end of the extractor, and the hook might then be broken rather than fully removed from the fish's mouth. Also, use of the previously known extractors causes the hook to be gouged out of the fish's mouth to do damage to the fish, and this is particularly important where an undersized fish has been caught, and it is desirous to merely remove the hook from the undersized fish to allow the fish to go back into the water without irreparable damage. Accordingly, this invention has for its objects the improvement over these known types of extractors, and other objects and advantages of this invention will become apparent upon reading the following description in light of the accompanying drawings, wherein:

Fig. 1 is a side perspective view of a fish hook extractor showing a preferred embodiment of this invention.

Fig. 2 is a side elevational view on an enlarged scale showing the extractor of Fig. 1.

Fig. 3 is a bottom plan view of the extractor shown in Fig. 2.

Figs. 4 and 5 are side elevational views of a fragment of the extractor shown in Fig. 2, but showing the parts thereof in progressively different positions from that shown in Fig. 2.

The same reference numerals refer to the same parts throughout the several views.

The drawings show the extractor to consist of a rod 10 which terminates in a handle portion 11 at one end of the rod, namely the rear end, while the front end of the rod terminates in a U-shaped fork 12. A sleeve or tube 13 is slidably telescoped over the intermediate portion of the rod 10 to be snugly disposed thereon. The rear end of the sleeve 13 has a disc or shoulder 14 suitably secured thereto by soldering or the like while the rod 10 has a similar disc or shoulder suitably secured to it by soldering or the like such that the two discs 14 and 16 can be spaced apart as shown with a compression coil spring 17 encircling the rod 10 to yieldingly urge the discs 14 and 16 away from each other. Correspondingly, the sleeve 13 is urged toward the front end of the rod 10. Also suitably attached to the sleeve 13 by soldering or the like is a trigger 18. It will be understood that the user would normally place the palm of his hand on the handle 11 and place the index finger in the trigger 18 so that the trigger and handle can be urged toward each other upon squeezing of the hand and compressing the spring 17. Figs. 1 and 2 show that the sleeve 13 is retained in a limit position forwardly on the rod 10 by abutting the base of the fork 12 which is, of course, suitably secured to the front end of the rod 10 as by soldering or the like. Figs. 2, 4 and 5 show that the sleeve 13 can be retractably slid with respect to the rod 10 for a purpose mentioned later.

The drawings also show a V-shaped wire or fish line guide 19 which includes two spaced apart legs 21 and 22 and a V-shaped crotch 23. The leg 21 is shown to be straight and is attached to the front end of the sleeve 13 by soldering or the like, and the leg 22 is shown to be curved away from the sleeve 13, and this curvature permits the fish line to be easily and readily hooked between the leg 22 and the sleeve 13 for purposes of positioning the extractor with respect to the fish hook as mentioned later. While referring to the guide 19, it should also be noted, as shown in Figs. 2, 4 and 5, that the crotch or front end of the guide is bent or disposed downwardly in a plane angular to the plane of the fork 12. It should also be noted, as best shown in Fig. 3, that the crotch of the U-shaped fork, such as shown at 24, is an arcuate curve and, for this purpose, the eyelet of the hook and the hook itself can be easily and readily positioned as required in the manner described hereinafter. Further, it will, of course, be seen that the fork 12 and the crotch 23 of the guide 19 are oppositely disposed and are in a common plane, which plane is transverse to the plane in which the fork 12 is disposed.

With the arrangement between the fork 12 and the crotch 23, as described above, it will be understood that the fish hook, designated 26, embedded in the fish's flesh, designated 27, will be disposed readily and easily in the position shown in Fig. 2. To establish this position, which is that of the hook 26 in abutting relation with the curved surface 24 of the fork 12, the fish line, designated 28, is easily caught with the guide leg 22, and the extractor is then slipped along the line to the position shown in Fig. 2. Upon retracting the extractor trigger 18, the sleeve 13 and the guide 19 are, of course, correspondingly retracted to the Fig. 4 position to where the crotch or end 23 of the guide 19 engages the fish's flesh 27. Movement of the sleeve 13 from the Fig. 4 to the Fig. 5 position next causes the end 23 to press downwardly on the flesh 27 while the fork 12 holds the hook in the upper position shown. This downward pressure on the flesh 27 is caused by the angularity of the end 23 such that the end 23 is suitably spaced from the fork 12 when the end 23 is moved rearwardly past the fork in the progressive positions shown in the drawings. It will also be noted that the crotch 23 is retracted in the direction of the curvature of the hook 26 to thereby slide the flesh 27 off the hook with a minimum of gouging of the flesh.

The fork 12, of course, includes a pair of legs 29 which extend laterally to a position spaced laterally beyond the extent of the guide 19. With this arrangement, the sleeve 13 is held against axial rotation by virtue of the respective dimensions between the fork legs 29 and the guide legs 21 and 22.

While a specific embodiment of this invention has been shown and described, it should be obvious that certain changes could be made therein, and the scope of this invention should, therefore, be limited only by the appended claims.

What is claimed is:

1. A fish hook ejector comprising a rod, a handle on one end of said rod, a fork on the other end of said rod, a sleeve slidably telescopically disposed over said rod with one end of said sleeve in limiting abutment with said fork in one limit position of sliding movement of said sleeve on said rod, a spring yieldingly urging said sleeve to said limit position, a trigger on said sleeve for retracting the latter on said rod against the influence of said spring, a V-shaped fish line guide attached to said sleeve on one side thereof and extending beyond the end of said sleeve and the free ends of said fork in a pointed end portion and being disposed along but spaced from said sleeve on the other side of said sleeve for guiding the fish line and the fish hook to a position within the limits of said fork, said pointed end of said guide extending away from said fork whereby it is spaced therefrom upon retracting said sleeve such that said pointed end moves past said fork, and said sides of said guide disposed within the lateral limits of said fork to abut the latter upon axial rotation of said sleeve on said rod.

2. In a fish hook ejector of the type including two slidably telescoping members, the combination comprising a handle attached to the rear end of the first member of said members, a trigger attached to the rear end of the second member of said members, a coil spring disposed between said members for urging said handle and said trigger away from each other, a fork attached to the front end of said first member and including two diverging legs disposed forward of said front end, a V-shaped guide including two legs and a crotch with one of said legs attached to one side of said second member and the other of said legs disposed along the other side of said second member and with said crotch disposed forward of said fork, said crotch being offset and disposed with respect to said fork for being spaced therefrom and moved therepast when said members are slid one on the other.

3. In a fish hook ejector of the type including two slidably telescoping members, the combination comprising a handle attached to the rear end of the first member of said members, a trigger attached to the rear end of the second member of said members, a coil spring disposed between said members for urging said handle and said trigger away from each other, a fork attached to the front end of said first member and including two divergent legs disposed forward of said front end to lie in a given plane, a wire disposed in a V-shape and including two legs disposed in a plane parallel to said given plane and including a crotch and having one of said legs attached to one side of said second member and the other of said legs disposed along the other side of said second member and with said crotch disposed forward of said fork, said crotch being angularly disposed with respect to said legs to be directed away from said given plane for being spaced from said fork and moved therepast when said members are slid one on the other.

4. In a fish hook extractor of the type including two slidably telescoping members, the combination comprising a handle attached to the rear end of the first member of said members, a trigger attached to the rear end of the second member of said members, a coil spring disposed between said members for urging said handle and said trigger away from each other, a fork attached to the front end of said first member and including two diverging legs disposed forward of said front end, a V-shaped guide including two legs and a crotch oppositely disposed with respect to said fork and overlying the same with one of said legs attached to one side of said second member and the other of said legs disposed along the other side of said second member and with said crotch disposed forward of said fork, said crotch being offset away from the plane of said fork and disposed with respect to said fork for being spaced therefrom and moved therepast when said trigger is pulled so that said members are slid one on the other.

5. A fish hook extractor comprising a rod, a handle on one end of said rod, a U-shaped fork on the other end of said rod, a sleeve slidably and telescopically disposed over said rod with one end of said sleeve in limiting abutment with said fork in one limit position of sliding movement of said sleeve on said rod, a spring yieldingly urging said sleeve to said limit position, a trigger on said sleeve for retracting the latter on said rod against the influence of said spring, a V-shaped wire member with one leg thereof attached to said sleeve on one side of the latter and extending beyond said sleeve and said fork in the apex portion thereof with said apex portion being oppositely faced and in the transverse plane of said fork and the other leg of said member being spaced from said sleeve on the other side of said sleeve for guiding the fish line and the fish hook to within the crotch of said fork, and said apex portion of said member being angularly disposed away from the plane of said fork to be spaced therefrom upon retracting said sleeve for moving said apex portion past said fork.

References Cited in the file of this patent
UNITED STATES PATENTS
2,054,236    Behr _____ Sept. 15, 1936